(12) United States Patent
Sasaki

(10) Patent No.: US 9,706,072 B2
(45) Date of Patent: Jul. 11, 2017

(54) IMAGE READING APPARATUS AND IMAGE FORMING APPARATUS

(75) Inventor: Takeshi Sasaki, Tsukuba (JP)

(73) Assignee: CANON FINETECH INC., Saitama-Ken (JP)

( * ) Notice: Subject to any disclaimer, the term of this patent is extended or adjusted under 35 U.S.C. 154(b) by 0 days.

(21) Appl. No.: 13/584,298

(22) Filed: Aug. 13, 2012

(65) Prior Publication Data

US 2013/0050781 A1    Feb. 28, 2013

(30) Foreign Application Priority Data

Aug. 31, 2011    (JP) .................................. 2011-189836

(51) Int. Cl.
H04N 1/04    (2006.01)
H04N 1/028    (2006.01)

(52) U.S. Cl.
CPC .................................. H04N 1/028 (2013.01)

(58) Field of Classification Search
CPC .................................................... H04N 1/028
USPC ....... 358/475, 483, 482, 474, 512–514, 505, 358/484, 497; 250/208.1, 239, 234–236, 250/216; 235/454
See application file for complete search history.

(56) References Cited

U.S. PATENT DOCUMENTS

| | | | | |
|---|---|---|---|---|
| 4,408,120 A | * | 10/1983 | Hara | G06K 7/10722 235/454 |
| 4,613,235 A | * | 9/1986 | Suga | G01N 21/57 356/446 |
| 5,617,131 A | * | 4/1997 | Murano et al. | 347/233 |
| 6,169,622 B1 | * | 1/2001 | Tsai et al. | 359/210.1 |

(Continued)

FOREIGN PATENT DOCUMENTS

CN    1991437 A    7/2007
CN    101713867 A    5/2010

(Continued)

OTHER PUBLICATIONS

Office Action, mailed Nov. 5, 2013, in Japanese Patent Application No. 2011-189836, Japanese Patent Office.

(Continued)

*Primary Examiner* — Cheukfan Lee
(74) *Attorney, Agent, or Firm* — Fitzpatrick, Cella, Harper & Scinto

(57) ABSTRACT

An image reading apparatus, including: a light source; a reflection member changing a traveling direction of the light reflected from an original; an optical system imaging the light; a photoelectric converter receiving the light from the optical system to convert the light into an electric signal; and a light passing and blocking member disposed between the optical system and the photoelectric converter, and provided with an aperture through which the light from the optical system imaged on the photoelectric converter passes, the blocking member blocking non-convergent light which is not imaged on the photoelectric converter, wherein the blocking member has an inclined surface surrounding the aperture so that the aperture gets smaller from the optical system toward the photoelectric converter, and a hypothetical extension plane extending from the inclined surface toward the photoelectric converter intersects with an optical axis of the optical system without intersecting with photoelectric converter.

7 Claims, 10 Drawing Sheets

(56) References Cited

U.S. PATENT DOCUMENTS

| | | | |
|---|---|---|---|
| 6,429,422 B1* | 8/2002 | Bohn | 250/234 |
| 6,433,328 B1* | 8/2002 | Chang | 250/216 |
| 6,683,706 B1* | 1/2004 | Keithley | H04N 1/48 348/272 |
| 6,917,453 B1* | 7/2005 | Onishi | H04N 1/031 250/208.1 |
| 7,224,495 B2* | 5/2007 | Yui et al. | 358/474 |
| 7,242,502 B2* | 7/2007 | Huang et al. | 358/475 |
| 7,262,888 B2* | 8/2007 | Kuo | 358/475 |
| 7,576,895 B2* | 8/2009 | Chen | 358/474 |
| 7,599,277 B1* | 10/2009 | Kato | G11B 7/124 369/112.09 |
| 7,652,801 B2* | 1/2010 | Haas et al. | 358/474 |
| 7,760,225 B2 | 7/2010 | Yoshizawa et al. | |
| 7,865,076 B2 | 1/2011 | Tamaki et al. | |
| 7,903,294 B2* | 3/2011 | Huang et al. | 358/474 |
| 8,130,431 B2 | 3/2012 | Oda et al. | |
| 8,203,769 B2* | 6/2012 | Herloski et al. | 358/505 |
| 8,446,647 B2* | 5/2013 | Mamada | H04N 1/0311 358/474 |
| 2005/0179962 A1 | 8/2005 | Williamson | |
| 2007/0241266 A1* | 10/2007 | Gweon | G02B 21/0032 250/225 |
| 2009/0109501 A1* | 4/2009 | Nagamochi | H04N 1/0311 358/475 |
| 2011/0176183 A1* | 7/2011 | Ikeda | G02B 3/0062 358/474 |
| 2012/0189293 A1* | 7/2012 | Cao | G03B 9/02 396/333 |

FOREIGN PATENT DOCUMENTS

| | | |
|---|---|---|
| EP | 1 992 492 A2 | 11/2008 |
| JP | 2000-081564 A | 3/2000 |
| JP | 2000-253217 A | 9/2000 |
| JP | 2002-101263 A | 4/2002 |
| JP | 2004-187039 A | 7/2004 |
| JP | 2006-85026 A | 3/2006 |
| WO | 2007-123064 A1 | 11/2007 |

OTHER PUBLICATIONS

Search Report issued in European Patent Office Application No. 12182124.3, dated Mar. 19, 2014.
Office Action—Chinese Patent Appln. No. 201210319091.6, Chinese Patent Office, Jul. 30, 2014.

* cited by examiner

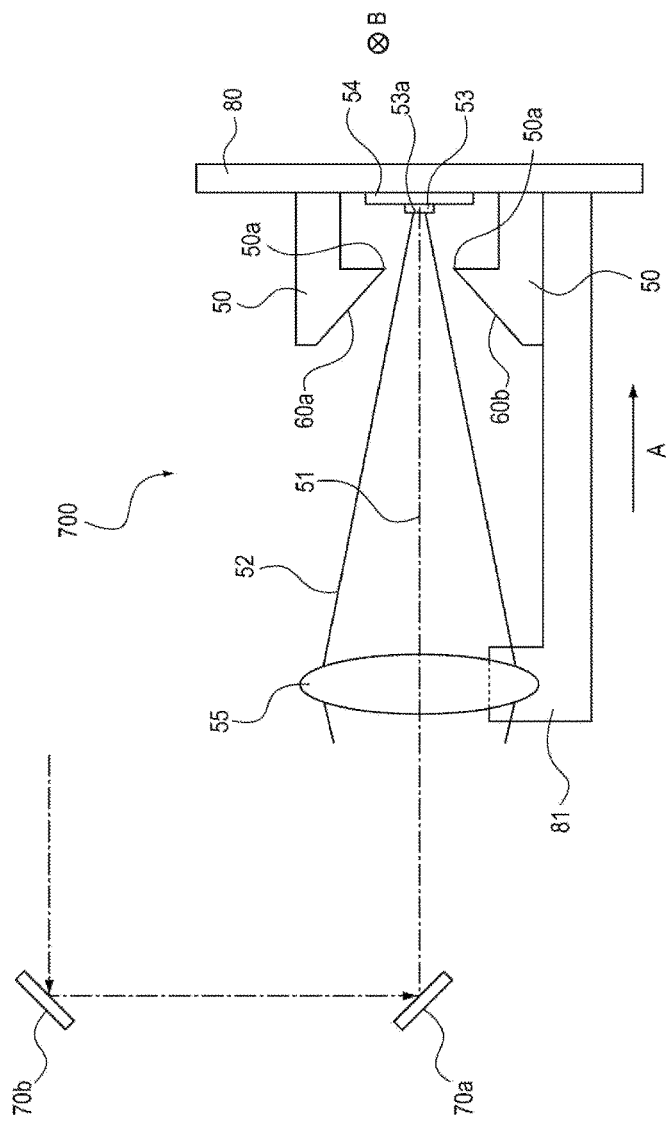

IMAGE READING APPARATUS AND IMAGE FORMING APPARATUS

BACKGROUND OF THE INVENTION

Field of the Invention

The present invention relates to an image reading apparatus including a light source, a reflection member configured to reflect light reflected from an original so as to change a traveling direction of the light, an optical system configured to condense and image the light reflected from the reflection member, and a photoelectric converter configured to receive the light passing through the optical system and convert the light into electric charge. Further, the present invention relates to an image forming apparatus including the image reading apparatus.

Description of the Related Art

In a conventional technology of an image reading apparatus, an image of an original is read in the following manner. That is, a light source irradiates the original with light, and a reflection member (reflection unit) guides the light reflected from the original to a lens optical system. Then, a photoelectric converter converts the light converged by the optical system into an electric signal. The electric signal is read as an image. In this case, if light (external light) from outside the image reading apparatus or light (stray light) not passing through a proper optical path inside the image reading apparatus strikes a photoelectric conversion element, the image of the original cannot be read properly, resulting in a defective image. To avoid this situation, there may be provided a configuration for covering the photoelectric converter (photoelectric conversion unit) to prevent the external light or stray light from entering the photoelectric conversion unit, or a configuration using as many members having a low reflectance as possible.

As for the configuration for covering the photoelectric converter, a configuration in which a light shielding member is disposed between the optical system and the photoelectric converter so that the light shielding member covers the entire optical path between the optical system and the photoelectric converter, or a configuration in which the entire photoelectric converter is simply covered is conceivable. With such a measure as described above, light which does not pass through the lens, such as the external light from outside the image reading apparatus and the stray light unintendedly reflected from any elements other than the proper optical path, can be blocked to some extent to prevent such a light from entering the photoelectric conversion element.

Japanese Patent Application Laid-Open No. 2000-81564 discloses the configuration using a member having a low reflectance. In the invention described in Japanese Patent Application Laid-Open No. 2000-81564, a light absorbing coating of black color is applied to a glossy surface opposite to a light entrance surface of a reflection mirror. The light absorbing member absorbs a non-effective light beam, whereas a light beam reflected without being absorbed by the light absorbing member is returned in a light entrance direction.

However, in the above-mentioned configuration for covering the photoelectric converter or configuration using a member having a low reflectance, it is difficult to completely prevent stray light, which passes through the proper optical system such as a lens via the vicinity of a proper optical path, from entering the photoelectric conversion element. As a result, there arise various problems in that the color of the image obtained through image reading becomes faint, that ghost occurs, and that the contrast ratio decreases due to decrease in color density.

Note that, as a measure against the stray light, there is a method of narrowing an aperture portion of the light shielding member to ensure an interval close to the width of the proper optical path. Even in this case, the stray light may be reflected from an upper, lower, right, or left wall surface of the light shielding member having the narrowed aperture portion so that the stray light enters the sensor. Therefore, when the aperture portion is simply narrowed, the image quality may be, in some cases, degraded as compared to the image quality before the measure is taken. Thus, the wall surfaces of the aperture portion of the light shielding member cannot easily be disposed in the vicinity of the light beam.

SUMMARY OF THE INVENTION

In view of the above-mentioned circumstances, the present invention provides an image reading apparatus in which only proper convergent light passing through an optical system reaches a light receiving portion so that a satisfactory image can be read without an image defect such as ghost, flare, and faint color.

According to an exemplary embodiment of the present invention, an image reading apparatus includes: a light source configured to irradiate an original with light; a reflection member configured to reflect the light reflected from the original so as to change a traveling direction of the light; an optical system configured to condense and image the light reflected from the reflection member; a photoelectric converter including a light receiving portion disposed at an imaging position of the optical system so as to receive the light from the optical system, the photoelectric converter being configured to convert the light into an electric signal; and a light passing and blocking member disposed between the optical system and the photoelectric converter, a part of the light passing and blocking member including an aperture through which convergent light, which converges from the optical system onto the photoelectric converter, passes, other part than the aperture of the light passing and blocking member being configured to block non-convergent light, which does not converge from the optical system onto the photoelectric converter, wherein the light passing and blocking member includes an inclined surface provided in a periphery of the aperture, the inclined surface being inclined so that the aperture gets smaller from the optical system toward the photoelectric converter, and wherein when a center axis of a light beam passing through the optical system is defined as an optical axis, a hypothetical extension plane extending from the inclined surface toward the photoelectric converter is set at a predetermined angle so as to intersect with the optical axis and avoid intersecting with the light receiving portion.

According to the present invention, only the proper convergent light passing through the optical system reaches the light receiving portion so that the satisfactory image can be read without the image defect such as ghost, flare, and faint color.

Further features of the present invention will become apparent from the following description of exemplary embodiments with reference to the attached drawings.

BRIEF DESCRIPTION OF THE DRAWINGS

FIG. 7 is an enlarged sectional view of illustrating an internal configuration of the integral unit.

DESCRIPTION OF THE EMBODIMENT

Hereinafter, an exemplary embodiment of carrying out the present invention will be described in detail based on an embodiment with reference to the attached drawings. Note that, dimensions, materials, shapes, and relative positions of components, and the like to be described in the embodiment may be changed as appropriate depending on a configuration of an apparatus to which the present invention is applied, or various conditions. Therefore, unless otherwise noted, the scope of the present invention is not limited only to those factors.

Figure 1:
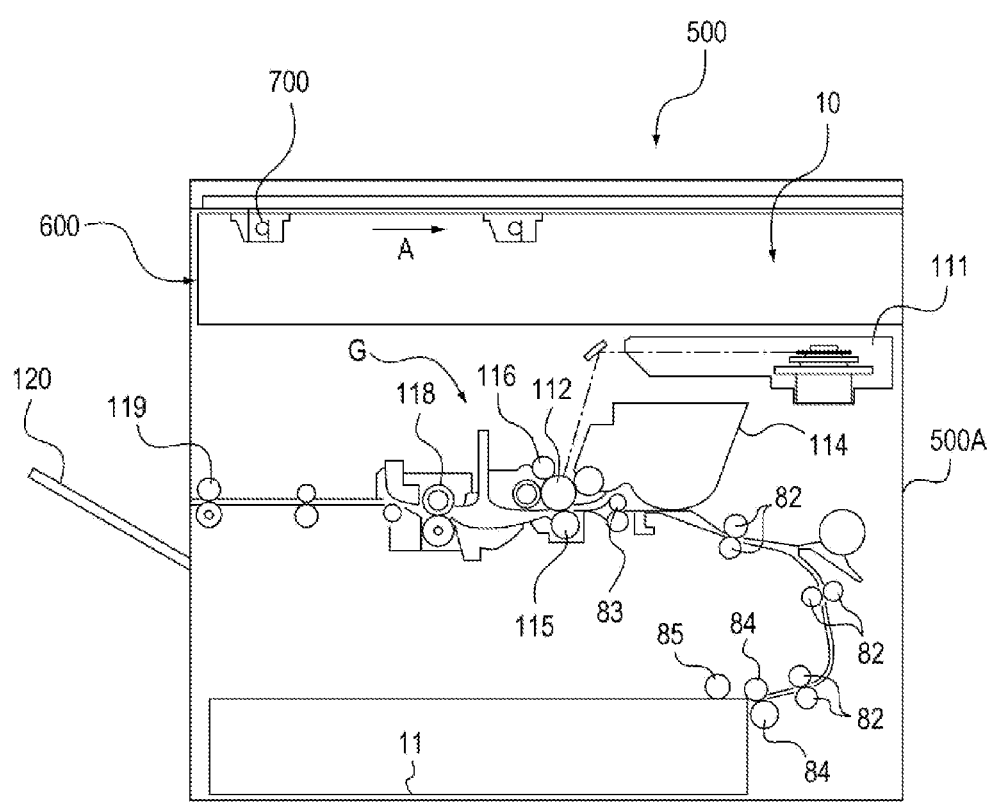
FIG. 1 is a sectional view of illustrating a configuration of an image forming apparatus according to an embodiment of the present invention.

FIG. 1 is a sectional view of illustrating a configuration of an image forming apparatus 500 according to the embodiment of the present invention. The image forming apparatus 500 is an image forming apparatus using an electrophotographic image forming process. As illustrated in FIG. 1, the image forming apparatus 500 has an image forming apparatus main body (hereinafter, referred to simply as "apparatus main body") 500A, and an image forming portion G configured to form an image is provided inside the apparatus main body 500A. The image forming portion G includes a photosensitive drum 112 corresponding to an "image bearing member", and a transfer roller 115 corresponding to a "transfer device". At least the photosensitive drum 112 may be included in a process cartridge and built into the apparatus main body 500A as the process cartridge.

A storage cassette 11 configured to store sheets, a pickup roller 85, a feed roller pair 84, conveyance roller pairs 82, and a registration roller pair 83 are provided inside the apparatus main body 500A. Further, the photosensitive drum 112, the transfer roller 115, a charging roller 116, an exposure device 111, a developing device 114, a fixing device 118, and a delivery roller pair 119 are disposed inside the apparatus main body 500A. A tray 120 is provided outside the apparatus main body 500A. Further, an image reading apparatus 600 is provided on an upper part of the apparatus main body 500A. The image reading apparatus 600 includes a frame member 10. An integral unit 700 (described later with reference to FIGS. 2, 3A, and 3B) is disposed inside the frame member 10.

Figure 2:
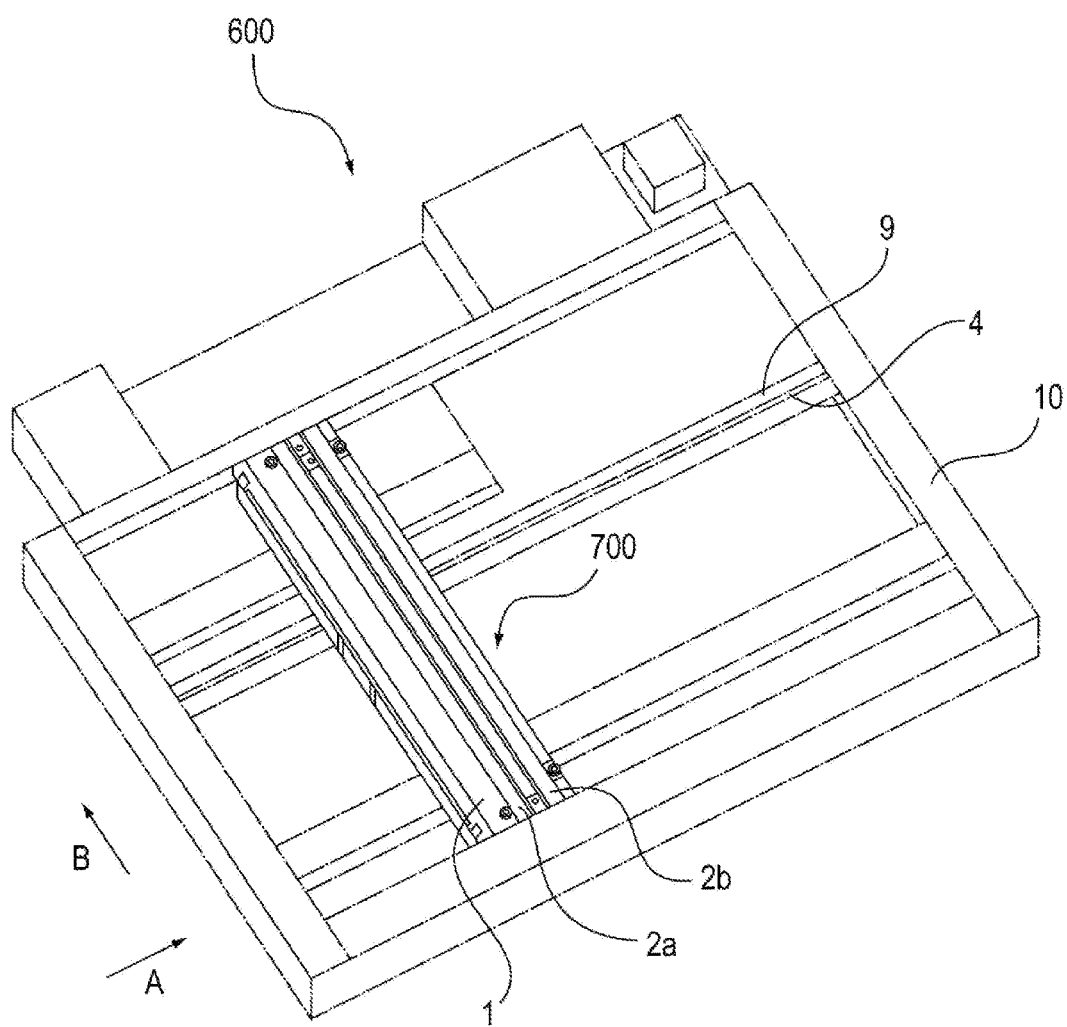
FIG. 2 is a perspective view of illustrating a configuration of an image reading apparatus.

FIG. 2 is a perspective view of illustrating a configuration of the image reading apparatus 600. The image reading apparatus 600 illustrated in FIG. 2 includes an integral scanning optical unit (hereinafter, referred to as "integral unit 700"). A light source, a reflection member (reflection means), an optical system, and a photoelectric converter (photoelectric conversion means) are provided integrally inside the integral unit 700. Further, a platen glass is provided above the frame member 10 of FIG. 2. On the platen glass, an original is to be placed with its image side facing downward. Further, the components inside the integral unit 700 scan the original on a lower side of the platen glass, and sequentially read images extending in a direction perpendicular to a scanning direction. At this time, the scanning direction is referred to as "sub-scanning direction A", and the direction perpendicular to the sub-scanning direction A is referred to as "main scanning direction B".

Figure 3A:
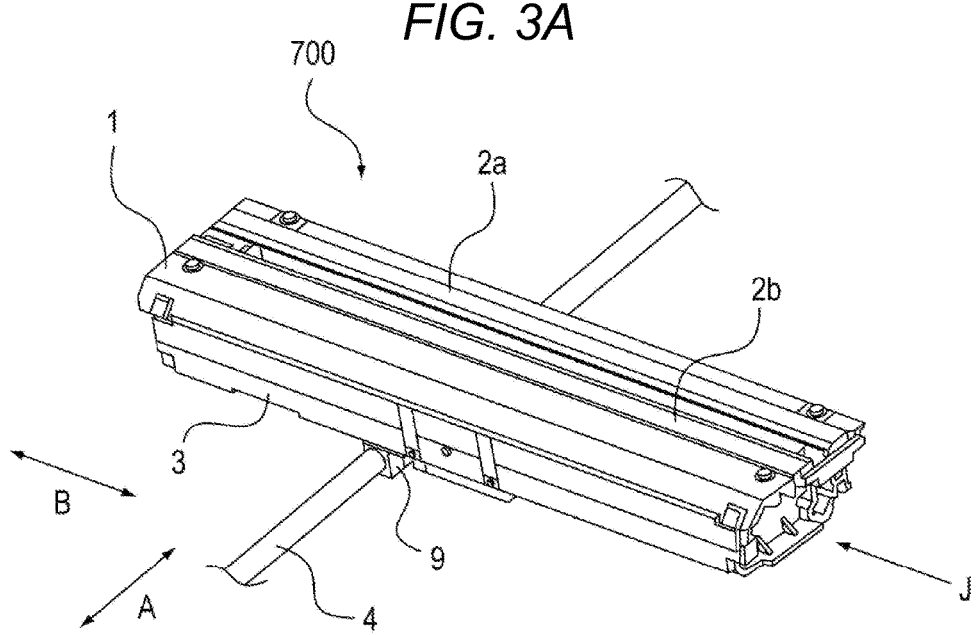
FIG. 3A is a perspective view of illustrating a configuration of an integral unit.

FIG. 3A is a perspective view of illustrating a configuration of the integral unit 700. As illustrated in FIG. 3A, the integral unit 700 includes a housing 3. A cover 1 is fixed to an upper part of the housing 3, and LEDs 2a and 2b as the "light source" are provided on the cover 1 so as to extend in the main scanning direction B. A bearing 9 through which a shaft 4 is inserted is fixed to a lower part of the housing 3. The integral unit 700 is movable in the sub-scanning direction A along the shaft 4 in accordance with rotation of the shaft 4.

Figure 3B:
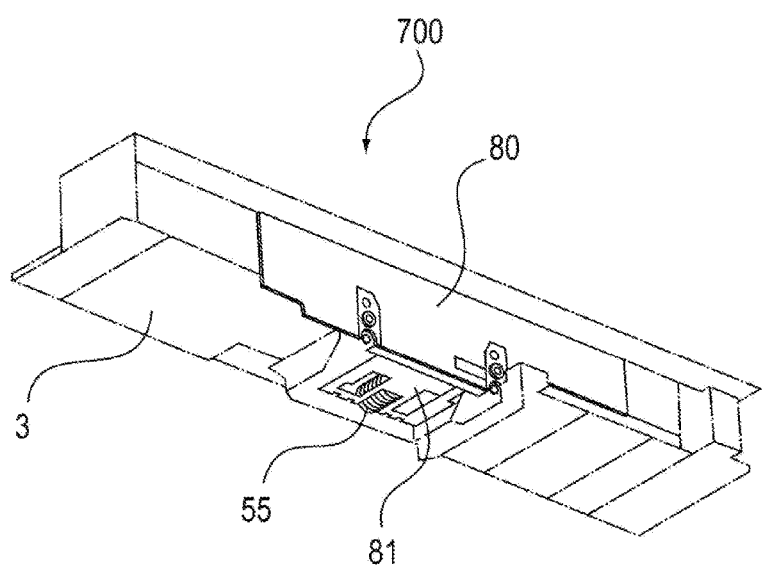
FIG. 3B is a perspective view of illustrating a configuration of the integral unit looking from a direction of the arrow J of FIG. 3A.

FIG. 3B is a perspective view of illustrating a configuration of the integral unit 700 looking from a direction of the arrow J of FIG. 3A (obliquely downward direction). As illustrated in FIG. 3B, in the integral unit 700, a substrate 80 is assembled to the housing 3, and a support member 81 is assembled to the substrate 80 so as to support a lens 55. A light shielding member 50 as a feature of the present invention is disposed on an inner surface side of the substrate 80 in FIG. 3B.

Figure 4:
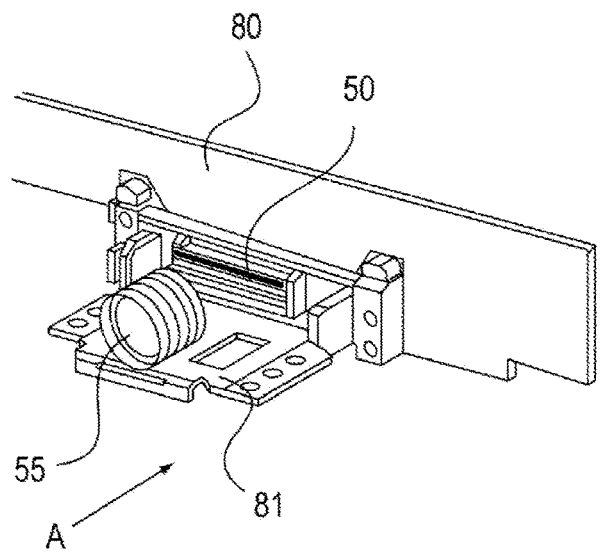
FIG. 4 is a perspective view of illustrating configurations of a substrate, a support member, a light shielding member, and a lens.

FIG. 4 is a perspective view of illustrating configurations of the substrate 80, the support member 81, the light shielding member 50, and the lens 55. As illustrated in FIG. 4, the support member 81 is fixed to the substrate 80 so as to support the lens 55. A CCD sensor 54 (see FIG. 7) as the "photoelectric converter (photoelectric conversion means)" is fixed to the substrate 80, and the light shielding member 50 is fixed so as to cover the CCD sensor 54.

Figure 5:
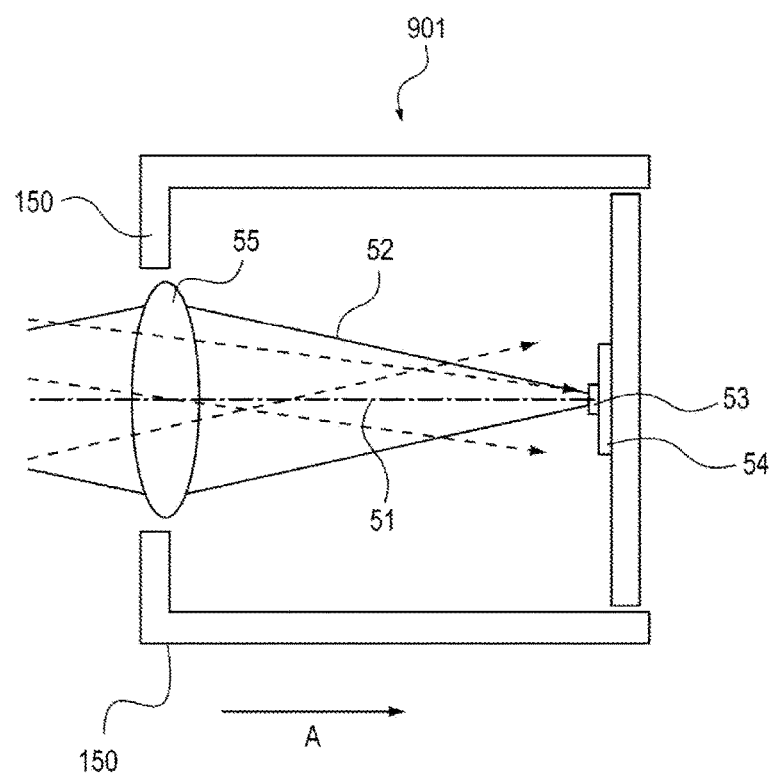
FIG. 5 is a sectional view of illustrating a configuration of an optical unit according to Comparative Example 1.

FIG. 5 is a sectional view of illustrating a configuration of an optical unit 901 according to Comparative Example 1, and illustrating a positional relationship among the lens 55, the CCD sensor 54, and a light shielding member 150 in the sub-scanning direction A. As illustrated in FIG. 5, the optical unit 901 according to Comparative Example 1 (conventional example) includes the lens 55 and the CCD sensor 54, which are covered with the light shielding member 150. It is understood that, because the light shielding member 150 covers the range from the lens 55 to the CCD sensor 54, external light can be prevented from entering a light receiving portion 53, but stray light passing through the lens 55 (broken lines) enters the light receiving portion 53 from every direction.

When the stray light is relatively strong light, whitish flare occurs in the read image. When the light is imaged or has color information on the original, ghost occurs. Even when the light is weak, as compared to the color of the original per se, the color density inevitably decreases, and the black density becomes thinner, with the result that the contrast ratio decreases.

Figure 6A:
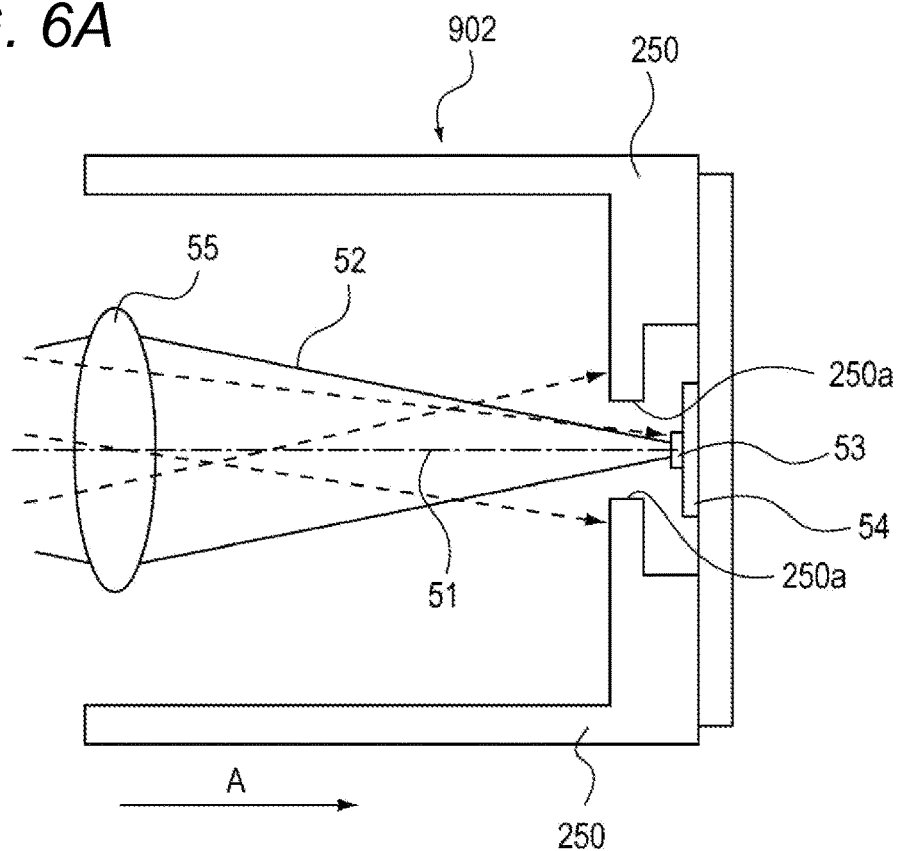
FIG. 6A is a sectional view of illustrating a configuration of an optical unit according to Comparative Example 2.

FIG. 6A is a sectional view of illustrating a configuration of an optical unit 902 according to Comparative Example 2, and illustrating a positional relationship among the lens 55, the CCD sensor 54, and a light shielding member 250 in the sub-scanning direction A. As illustrated in FIG. 6A, the optical unit 902 according to Comparative Example 2 includes the lens 55 and the CCD sensor 54, and includes the light shielding member 250 between the lens 55 and the CCD sensor 54. An aperture portion 250a is formed in the light shielding member 250, and the aperture portion 250a is set narrow so that the stray light (broken lines) is prevented from entering the CCD sensor 54.

Figure 6B:
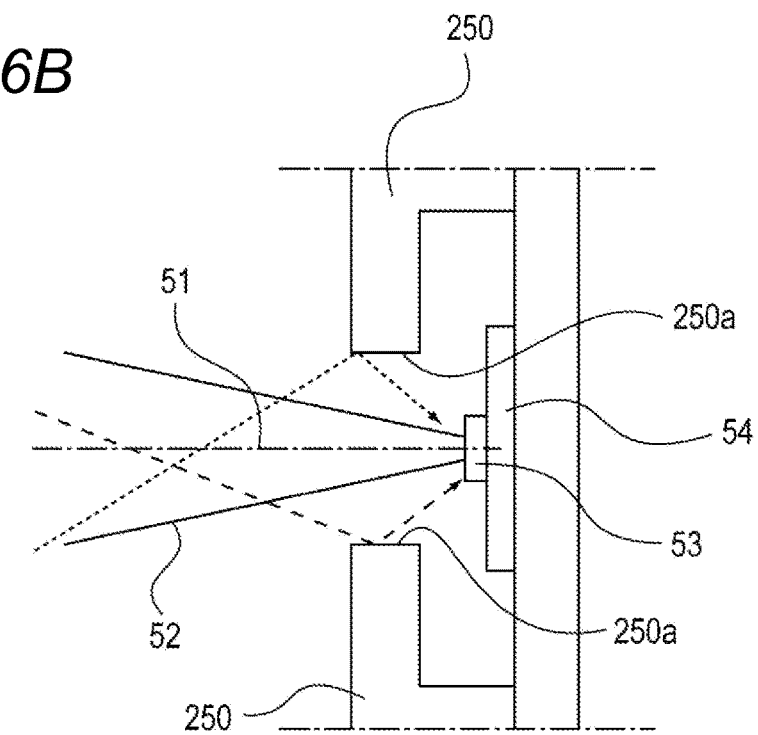
FIG. 6B is a partially enlarged sectional view of FIG. 6A.

FIG. 6B is a partially enlarged sectional view of FIG. 6A and illustrates a state in which the stray light enters the CCD sensor 54. As illustrated in FIG. 6B, at first glance, it appears that a majority of the stray light is prevented from entering the CCD sensor 54, but when the stray light is situated in the vicinity of a light beam 52, the stray light may be reflected from a wall surface of the aperture portion 250a, and may enter the light receiving portion 53. At this time, when the stray light is strong light, the read image may be affected even more adversely, and in this case, the shape of the light shielding member 150 as illustrated in FIG. 5 may further be desired. Thus, the configuration of the wall surfaces of the aperture portion 250a is unstable.

FIG. 7 is an enlarged sectional view of illustrating an internal configuration of the integral unit 700 and illustrates a positional relationship among the lens 55, the CCD sensor 54, and the light shielding member 50 in the sub-scanning direction A. As illustrated in FIG. 7, the light beam 52 passing through the lens 55 is imaged on the light receiving portion 53 of the CCD sensor 54. At this time, a positional relationship among the lens 55, the light receiving portion 53, and the light beam 52 having image information is adjusted in advance about an optical axis 51.

The integral unit 700 integrally includes the LEDs 2a and 2b, mirrors 70a and 70b, the lens 55, and the CCD sensor 54. Each of the LEDs 2a and 2b corresponding to the "light source" (illumination means) is a device configured to irradiate the original with light. The LEDs 2a and 2b are fixed in lines along the main scanning direction B (see FIG. 3A). Each of the mirrors 70a and 70b corresponding to the "reflection member (reflection means)" is a member configured to condense the light reflected from the original and reflects the light so as to change a traveling direction of the light. The lens 55 corresponding to the "optical system" (imaging means) is a member configure to condense and image the light reflected from the mirrors 70a and 70b. The CCD sensor 54 corresponding to the "photoelectric converter (photoelectric conversion means)" is a device including the light receiving portion 53 disposed at an imaging position of the lens 55 so as to receive the light from the lens 55. The CCD sensor 54 is configured to convert the light into an electric signal.

Note that, the number, position, reflection angle, and optical path length of the mirrors 70a and 70b may be set as appropriate in accordance with the size of the entire image reading apparatus 600, the performance of the lens 55, and the light intensity of the illumination. Such setting is not limited to the case of the integral unit 700, and is performed in the same manner for an image reading apparatus of a type of reading an image in the main scanning direction B while scanning the original in the sub-scanning direction A.

With the configuration described above, the light irradiated from the LEDs 2a and 2b is first reflected from the surface of the original, and at least a part of the reflection light enters the housing 3 of the integral unit 700. The light is reflected from, for example, the one or more mirrors 70a and 70b inside the housing 3 so that the path of the light beam 52 is adjusted. Then, the light is guided to the lens 55.

The light beam 52 passing through the lens 55 is imaged on a light receiving surface 53a of the CCD sensor 54. The CCD sensor 54 has photoelectric conversion elements arrayed in the main scanning direction B (direction perpendicular to the drawing sheet of FIG. 7), and the light receiving surface 53a of the CCD sensor 54 is elongated in the main scanning direction B. The CCD sensor receives information on the original in the main scanning direction B as light intensity in association with light illuminating the original in the main scanning direction B. The light intensity is stored in the CCD sensor 54, and the light intensity is converted into an electric charge amount to be transferred as image information, with the result that the image of the original can be read.

Color filters are applied to a light entrance surface of the photoelectric conversion element in accordance with color information to be read, and are arrayed in the sub-scanning direction A. The position of the light receiving surface 53a of the CCD sensor 54 is adjusted as appropriate substantially at a focus position of the lens 55 in view of, for example, variation in the focal point of the lens 55 to be used, variation in the support member 81, and variation in mounting of the CCD sensor 54. The reflection light of the original which is imaged by the lens 55 is received by the light receiving surface 53a of the CCD sensor 54, and the light intensity is converted into an electric signal. After that, the image information in the form of the electric signal undergoes processing at a software image processor (image processing means), and a read image is obtained as a result.

The integral unit 700 includes the light shielding member 50. The light shielding member 50 corresponding to a "light passing and blocking member (light passing and blocking means)" is disposed between the lens 55 and the CCD sensor 54. An aperture 50a is provided in a part of the light shielding member 50 so that the light beam 52 corresponding to "convergent light", which converges from the lens 55 onto the CCD sensor 54, is allowed to pass through the aperture 50a. At the same time, other part of the light shielding member 50 than the aperture 50a blocks non-convergent light, which does not converge from the lens 55 onto the CCD sensor 54 (corresponding to the stray light), and covers the light receiving portion 53 so as to prevent light other than the light passing through the lens 55 from entering the light receiving portion 53.

The configuration of the light shielding member 50 will be described in more detail. The light shielding member 50 includes wall surfaces 60a and 60b each corresponding to an "inclined surface", which is provided in a periphery of the aperture 50a. Each of the wall surfaces 60a and 60b is inclined so that the aperture 50a gets smaller from the lens 55 toward the CCD sensor 54. The CCD sensor 54 is fixed to the substrate 80, and the light shielding member 50 is integrally fixed to the substrate 80. The outer peripheral surface of the light shielding member 50 extends flat (in a shape of a flat surface) in the sub-scanning direction A.

The support member 81 configured to support the lens 55 is fixed to the substrate 80. Further, on a front surface side of the support member 81 at a proximal end thereof, the light shielding member 50 is fixed to the substrate 80. When the support member 81 is fixed to the substrate 80, the support member 81 is assembled in abutment against the light shielding member 50, and hence the support member 81 is positioned by the light shielding member 50. As described above, in the relationship in which the light shielding member 50 positions the support member 81 and the support member 81 positions the lens 55, the light shielding member 50 positions the lens 55 via the support member 81 reliably. As a result, the dimension between the lens 55 and the CCD sensor 54 is easily set to an optimum value.

Figure 8:
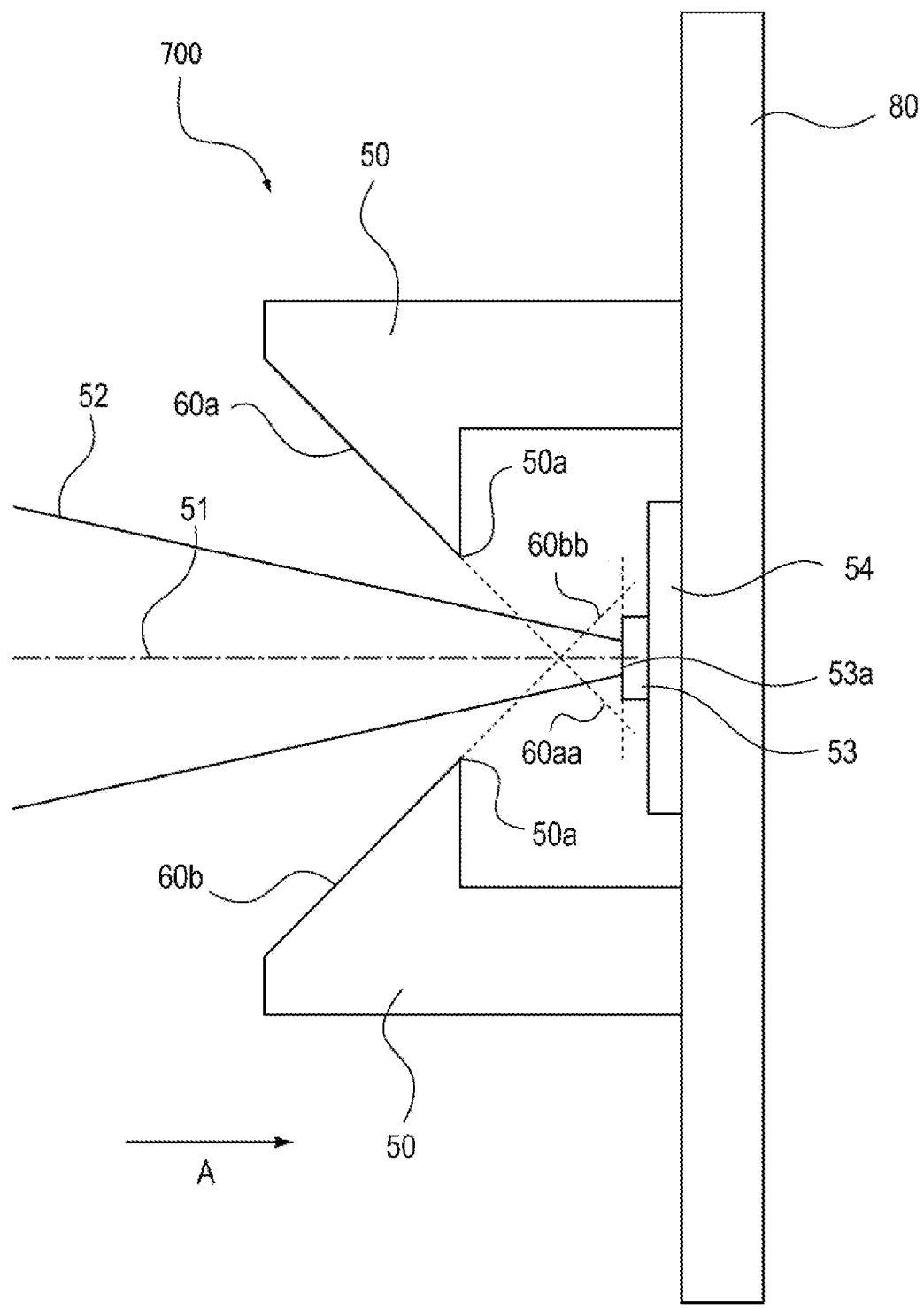
FIG. 8 is a partially enlarged sectional view of FIG. 7.

FIG. 8 is a partially enlarged sectional view of FIG. 7. In this case, a center axis of the light beam 52 passing through the lens 55 is defined as the optical axis 51. Further, there has been described that the light shielding member 50 includes the wall surfaces 60a and 60b each inclined from the side of the lens 55 toward the side of the CCD sensor 54. In this case, imaginary extension planes extending from the wall surfaces 60a and 60b toward the CCD sensor 54 are defined as hypothetical extension planes 60aa and 60bb, respectively. Each of the hypothetical extension planes 60aa and 60bb is set at a predetermined angle so as to intersect with the optical axis 51 and avoid intersecting with the light receiving surface 53a of the light receiving portion 53. Note that, the intersection point between the hypothetical extension planes 60aa and 60bb is positioned between the lens 55 and the light receiving surface 53a.

Figure 9:
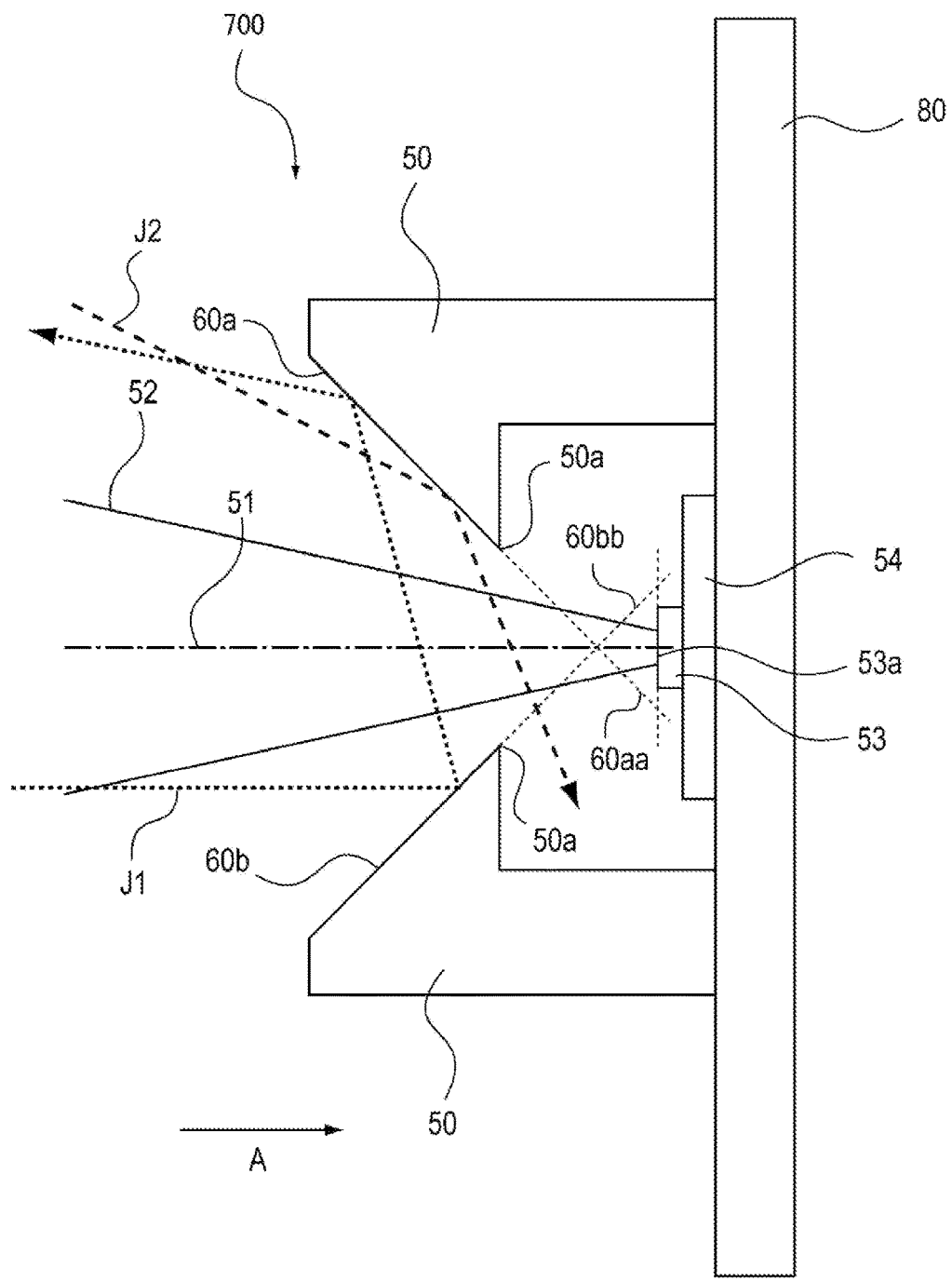
FIG. 9 is a partially enlarged sectional view similar to FIG. 8, of additionally illustrating a state of stray light.

FIG. 9 is a partially enlarged sectional view similar to FIG. 8, of additionally illustrating a state of the stray light. As illustrated in FIG. 9, stray light beams J1 and J2 passing through the lens 55 are reflected from the wall surfaces 60b and 60a, respectively. According to the law of reflection, light entering a flat surface at an angle θ is reflected from the flat surface at the angle θ. For example, the stray light beam J1 is reflected from the wall surface 60b and then reflected from the wall surface 60a to travel in a direction opposite to the convergence direction. The stray light beam J2 is reflected from the wall surface 60a and then travels toward the interior of the light shielding member 50, but reaches other part than the light receiving portion 53.

As described above, in the case where the wall surfaces 60a and 60b have the positional relationship as illustrated in FIG. 9 relative to the optical axis 51 and the light receiving surface 53a, even when the stray light strikes the wall surfaces 60a and 60b at every angle, the reflection light does not enter the light receiving portion 53. Therefore, the aperture 50a of the light shielding member 50 can be narrowed to the extent possible so as to prevent the direct entrance of the stray light.

In a case where the wall surfaces 60a and 60b are diffusing surfaces each having a low reflection characteristic, there is no change in the effect even when the stray light beams J1 and J2 diffuse at the time of reflection from the wall surfaces 60a and 60b. Such light does not enter the light receiving portion 53, and accordingly an image defect having a low color density is unlikely to occur, with the result that a satisfactory read image having a high contrast ratio can be obtained.

Figure 10:
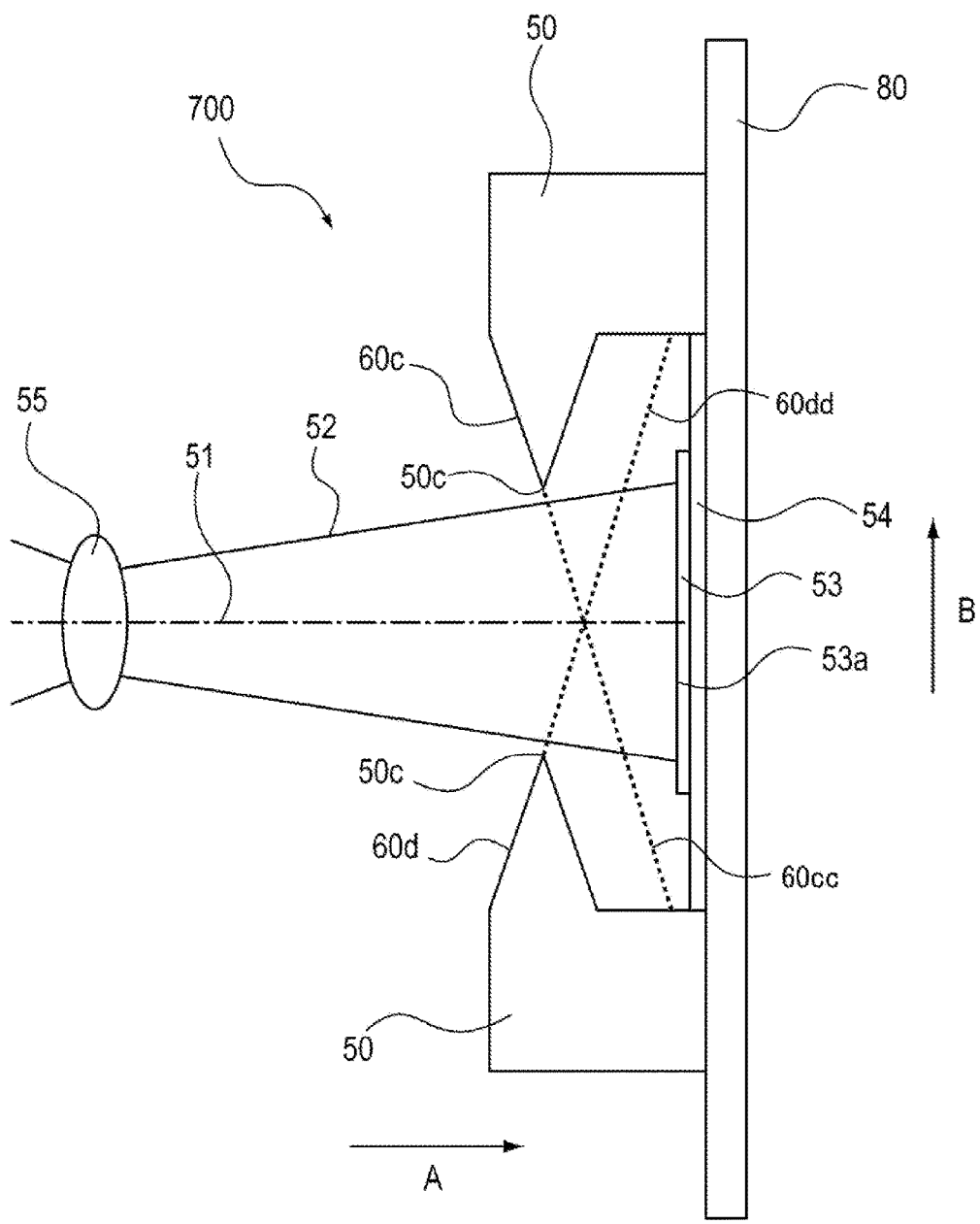
FIG. 10 is a partially enlarged sectional view of illustrating a configuration of the integral unit.

FIG. 10 is a partially enlarged sectional view of illustrating a configuration of the integral unit 700 in a cross section taken in the main scanning direction B. In FIGS. 1 to 9, the configuration of the integral unit 700 in the cross section taken in the sub-scanning direction A has been described, and the same applies also to the configuration in the cross section taken in the main scanning direction B. Hypothetical extension planes 60cc and 60dd, which are imaginary planes respectively extending from wall surfaces 60c and 60d that define an aperture 50c of the light shielding member 50, are each set at a predetermined angle so as to intersect with the optical axis 51 and avoid intersecting with the light receiving surface 53a of the light receiving portion 53. The effect obtained in the configuration in the cross section taken in the sub-scanning direction A is similarly obtained in the configuration in the cross section taken in the main scanning direction B.

Figure 11:
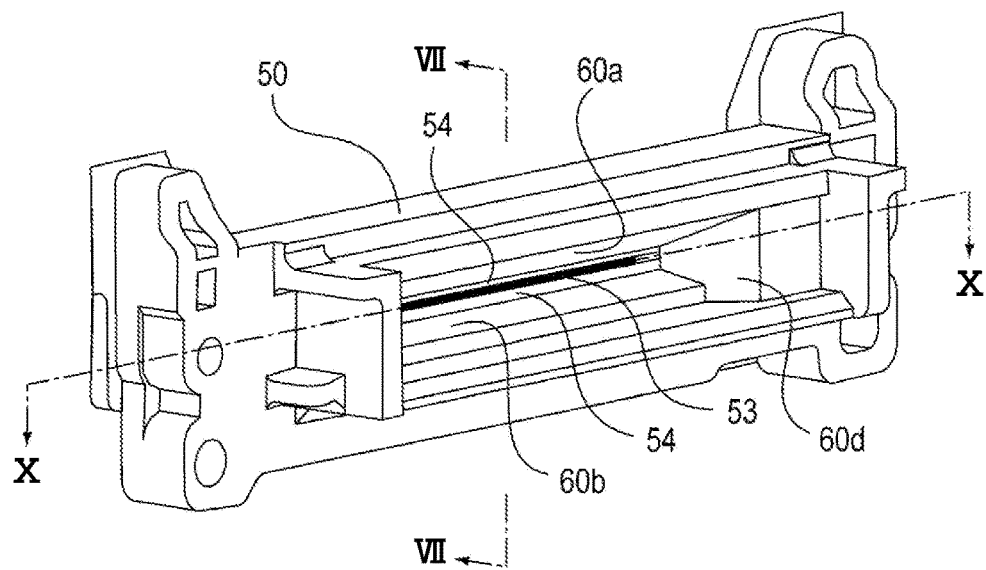
FIG. 11 is a perspective view of illustrating a configuration of the light shielding member.

FIG. 11 is a perspective view of illustrating a configuration of the light shielding member 50. The cross section taken along the line VII-VII of FIG. 11 corresponds to the sectional view of FIG. 7, and the cross section taken along the line X-X of FIG. 11 corresponds to the sectional view of FIG. 10. As illustrated in FIG. 11, the aperture portion of the light shielding member 50 is defined by the inclined wall surfaces 60a to 60d, and the light receiving portion 53 is seen through the aperture portion.

Note that, in the embodiment described above, the wall surfaces 60a to 60d that define the aperture portion of the light shielding member 50 are formed in a shape of a substantially four-sided pyramid, but the present invention is not limited to this configuration. That is, the wall surfaces that extend in the periphery of the aperture 50a of the light shielding member 50 may be formed in a shape of a substantially cone, and this configuration may produce a similar effect. In that case, in consideration of a hypothetical extension plane extending from the wall surface toward the CCD sensor 54, the convergent light is focused at a vertex of the hypothetical cone. The hypothetical extension plane is set at a predetermined angle so that the vertex of the hypothetical cone is positioned between the lens 55 and the CCD sensor 54 in the direction of the optical axis 51. The hypothetical extension plane is set so as to intersect with the optical axis 51 and avoid intersecting with the light receiving portion 53. Accordingly, the stray light reflected from the wall surface does not enter the light receiving portion 53.

According to the configuration of the embodiment, the light shielding member 50 is disposed between the lens 55 and the CCD sensor 54, and the light shielding member 50 has the aperture 50a so that the light beam 52 is allowed to pass through the aperture 50a in the direction of the CCD sensor 54. The aperture 50a is narrowed to the extent possible so that the stray light passing through the lens 55 can be prevented from directly reaching the CCD sensor 54. Further, the wall surfaces 60a and 60b cause the improper convergent light passing through the lens 55 to reach the part other than the light receiving portion 53 of the CCD sensor 54. As a result, only the proper convergent light passing through the lens 55 reaches the light receiving portion 53 so that a satisfactory image can be read without an image defect such as ghost, flare, and faint color.

Note that, the following is necessary for the image reading apparatus 600, which has the LEDs 2a and 2b, the mirrors 70a and 70b, the lens 55, and the CCD sensor 54, which are assembled integrally into the same housing 3, and is configured to read an image by moving the housing 3 in the sub-scanning direction A. Specifically, it is necessary to guide the light beam 52 to the lens 55 with a sufficient optical path length ensured by reflecting light on the multiple mirrors 70a and 70b at a small distance in a limited space. Therefore, in the optical path inside the housing 3, the incident light and reflection light on the mirrors 70a and 70b and other incident light and reflection light are situated in extreme proximity. The housing 3 is filled with light, and hence it is difficult to cause only the proper light beam 52 to reach the lens 55, with the result that the stray light may also pass through the lens 55 in many cases. According to the configuration of the embodiment, such a phenomenon is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189836, filed Aug. 31, 2011, which is hereby incorporated by reference herein in its entirety.

What is claimed is:

1. An image reading apparatus, comprising:
a light source configured to emit light toward an original;
an optical system configured to guide a reflection light of the light emitted toward the original;
a light receiving portion configured to receive the light from the optical system; and
an aperture portion disposed between the optical system and the light receiving portion and configured to guide the light from the optical system to the light receiving portion, the aperture portion having a light blocking part including an inclined surface provided in a periphery of the aperture portion, the inclined surface being inclined so that an aperture of the aperture portion gets smaller toward the light receiving portion, wherein
an inclined angle of the inclined surface is set at a predetermined angle so as to prevent light of the optical system that is reflected from the inclined surface from arriving at the light receiving portion.

2. The image reading apparatus according to claim 1, wherein the light blocking part covers the light receiving portion so as to prevent light other than the light passing through the optical system from arriving at the light receiving portion.

3. The image reading apparatus according to claim 1, wherein the light receiving portion is fixed to a substrate, and the light blocking part is integrally fixed to the substrate.

4. The image reading apparatus according to claim 1, further comprising a support member configured to fix the optical system, wherein
the aperture portion fixes the support member so that the aperture portion positions the optical system via the support member.

5. An image forming apparatus, comprising:
an image forming portion configured to form an image; and
the image reading apparatus as recited in claim 1.

6. The image reading apparatus according to claim 1, wherein a hypothetical extension plane extending from the inclined surface toward the light receiving portion does not intersect with the light receiving portion.

7. The image reading apparatus according to claim 1, wherein the optical system is configured to condense and image the reflection light onto the light receiving portion.

* * * * *